United States Patent [19]

Ganley et al.

[11] 4,028,885
[45] June 14, 1977

[54] ROTARY ENGINE

[76] Inventors: Thomas J. Ganley, 46-08 195th St., Flushing, Queens County, N.Y. 11358; Eamon P. Cronin, 116 Prospeck Park West, Brooklyn, N.Y. 11215

[22] Filed: Apr. 22, 1974
(Under Rule 47)

[21] Appl. No.: 463,132

Related U.S. Application Data

[63] Continuation-in-part of Ser. No. 163,020, July 15, 1971, abandoned.

[52] U.S. Cl. .............................................. 60/39.75
[51] Int. Cl.² .............................................. F02C 5/06
[58] Field of Search ................ 60/39.35, 39.75; 415/76, 80; 418/94, 266

[56] References Cited

UNITED STATES PATENTS

| 722,185 | 3/1903 | Robinson | 418/266 |
|---|---|---|---|
| 939,229 | 11/1909 | Dod | 60/39.75 X |
| 1,266,298 | 5/1918 | Metcalf | 418/94 X |
| 1,267,105 | 5/1918 | Mulligan | 60/39.75 X |
| 1,277,626 | 9/1918 | Milke | 60/39.75 |
| 1,357,993 | 11/1920 | Kemmer | 60/39.75 X |
| 1,427,692 | 8/1922 | Mahon et al. | 123/8.45 X |
| 1,752,093 | 3/1930 | King | 418/93 X |
| 1,776,921 | 9/1930 | Moessinger | 418/93 |
| 1,952,197 | 3/1934 | Davis | 415/76 UX |
| 2,158,532 | 5/1939 | Bullen | 123/8.23 |
| 2,412,949 | 12/1946 | Brown et al. | 123/8.15 |

FOREIGN PATENTS OR APPLICATIONS

| 1,825 | 11/1914 | United Kingdom | 60/39.75 |
|---|---|---|---|
| 296,564 | 9/1928 | United Kingdom | 60/39.75 |

*Primary Examiner*—Carlton R. Croyle
*Assistant Examiner*—Michael Koczo, Jr.

[57] ABSTRACT

A rotary engine utilizing a pair of rotary compressor units which provide a pressurized combustible fluid to a feed mechanism in timed sequence. The fluid is caused to expand and travel through the engine rotor so as to rotate the engine drive shaft. Both compressor units and the feed mechanism are driven in timed relationship by the engine drive shaft.

13 Claims, 7 Drawing Figures

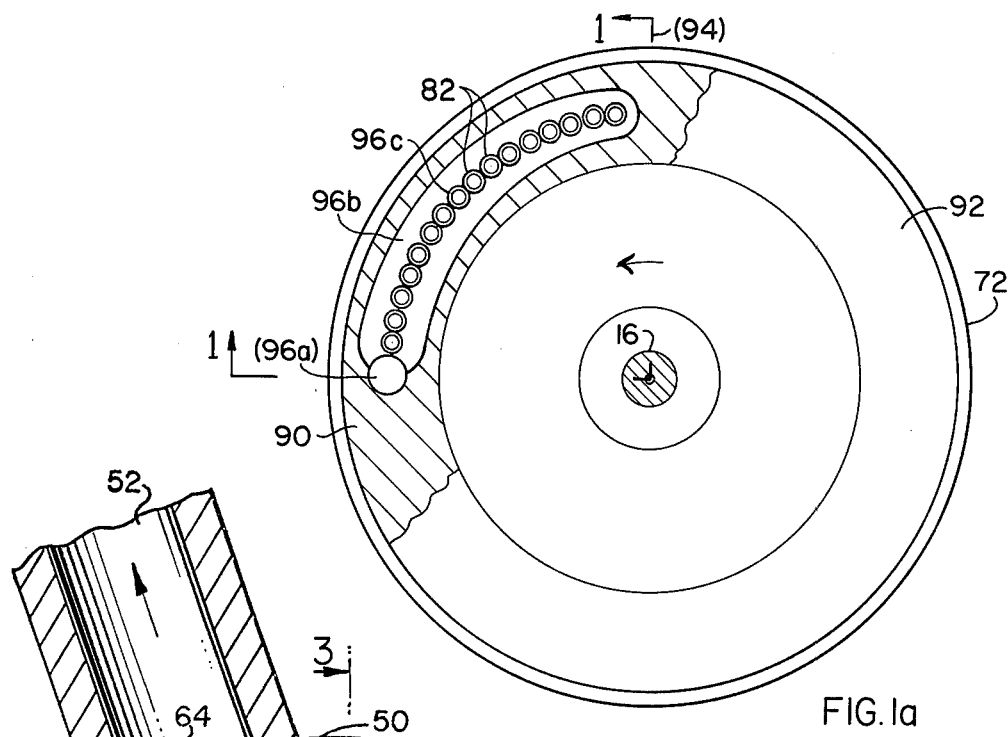
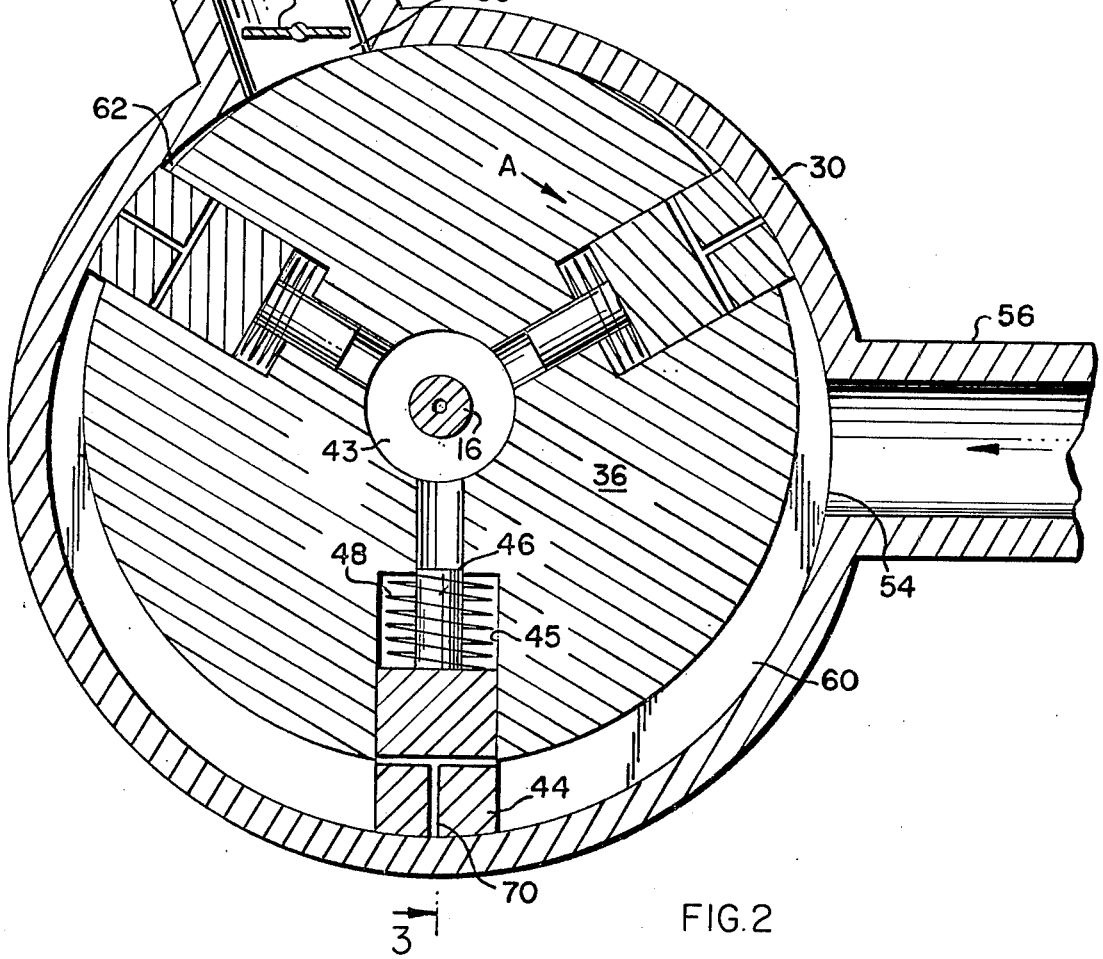

ROTARY ENGINE

The present application is a continuation in part of Ser. No. 163,020 filed July 15, 1971, and now abandoned, for which all equitable and rights are claimed and the disclosure of which is referred to and incorporated herein.

IMPROVEMENTS RELATING TO ROTARY ENGINES

The present invention relates to a rotary engine, and more particularly to a rotary engine in which measured amounts of a combustible fluid are expanded and directed through the engine rotor so as to develop the thrust to drive the engine.

BACKGROUND OF INVENTION

A great deal of effort is currently being made to develop internal combustion engines having low pollution emissions and negligible exhaust wastes. This effort is clearly hampered by the fact that in order to maintain the noxious wastes at a minimum performance and efficiency must be sacrificed. On the other hand manufacturers have resorted to the development of a number of auxiliary devices such as afterburners, catylitic mufflers etc. to deal with the exhaust gases while maintaining the engine substantially in its present form.

It is the prime object of the present invention to provide a new engine having high efficiency and low exhaust wastes.

It is also an object of the present invention to provide a new and improved rotary engine.

One object of the invention is to provide a rotary engine which produces a maximum of power with minimum generation of heat.

Another object of the invention is the provision of a rotary engine in which means are provided for readily regulating the braking force on the drive rotor.

A further object of the invention is the provision of a rotary engine in which the drive rotor receives a maximum of the combusted gases each revolution and thereby develops maximum rotational thrust.

Other objects, advantages, and features of the invention will be more clearly understood from the following description of the invention.

SUMMARY OF INVENTION

Broadly, the engine of the present invention comprises a drive rotor operatively connected to a drive shaft and adapted to rotate said shaft. The rotor is provided with a plurality of circumferential bores to which gas is fed. A pair of compressor units flanks the rotor and provides pressurized combustible fluid in timed sequence to an ignition means which ignites the fluids. The ignited fluid is passed via conduit means into successively selected bores of the rotor. The introduced combusted fluid expands into a highly pressurized gas developing a rotational thrust in the rotor. Conduit means are provided for exhausting the combusted fluids.

In the preferred form of the invention the compressor units each comprise a rotor mounted within a sealed chamber. The rotors are eccentrically fixed to the drive shaft to rotate therewith and include a plurality of wipers which slide on the inner wall of the chamber. A mixture of gas and air is fed to the chamber where it is compressed and then forced to a common collector. The collector stores the compressed gas for subsequent sequential feed to the drive rotor.

Further in the preferred form of the invention sequential feed means are provided which comprises a small rotatable compartment which is arranged for conjoint rotation with the drive shaft. The compartment receives compressed gas from the collector and feeds the same to the rotor. It will be observed that the operation of the compressor and the feed means are jointly dependent on the movement of the drive shaft.

Full details of the present invention are set forth in the following description of the preferred embodiment in which reference is made to the accompanying drawings.

BRIEF DESCRIPTION OF THE DRAWINGS

In the drawings:

FIG. 1 is a cross-sectional view of the rotary engine of this invention, the upper portion of FIG. 1 being along a radial plane vertical to ground while the lower portion being along a radial plane extending angularly outwardly therefrom, corresponding to line 1—1 of FIG. 1a;

FIG. 1a is a sectional view taken in the direction of lines 1a—1a of FIG. 1, with the cooling jacket removed showing the movement of the rotor past the exhaust openings.

FIG. 2 is a cross-sectional view of one of the compressor units taken along the line 2—2 of FIG. 1;

FIG. 5 is a frontal view of the drive rotor of FIG. 1, while

Turning now to FIG. 1, the engine assembly comprises a drive unit 10 flanked between a pair of compression units 12 and 14 which are mirror images of each other. The drive unit 10 and the compression units are axially arranged about a hollow central drive shaft 16 which is connected at its forward end 18 as by a suitable gear train so as to drive a load such as a vehicle, hoist or other motive means. A starting gear 20 which may be part of the gear train is connected to an electric motor 22 or battery motor so that initial starting and functioning can be obtained.

Figure 1:
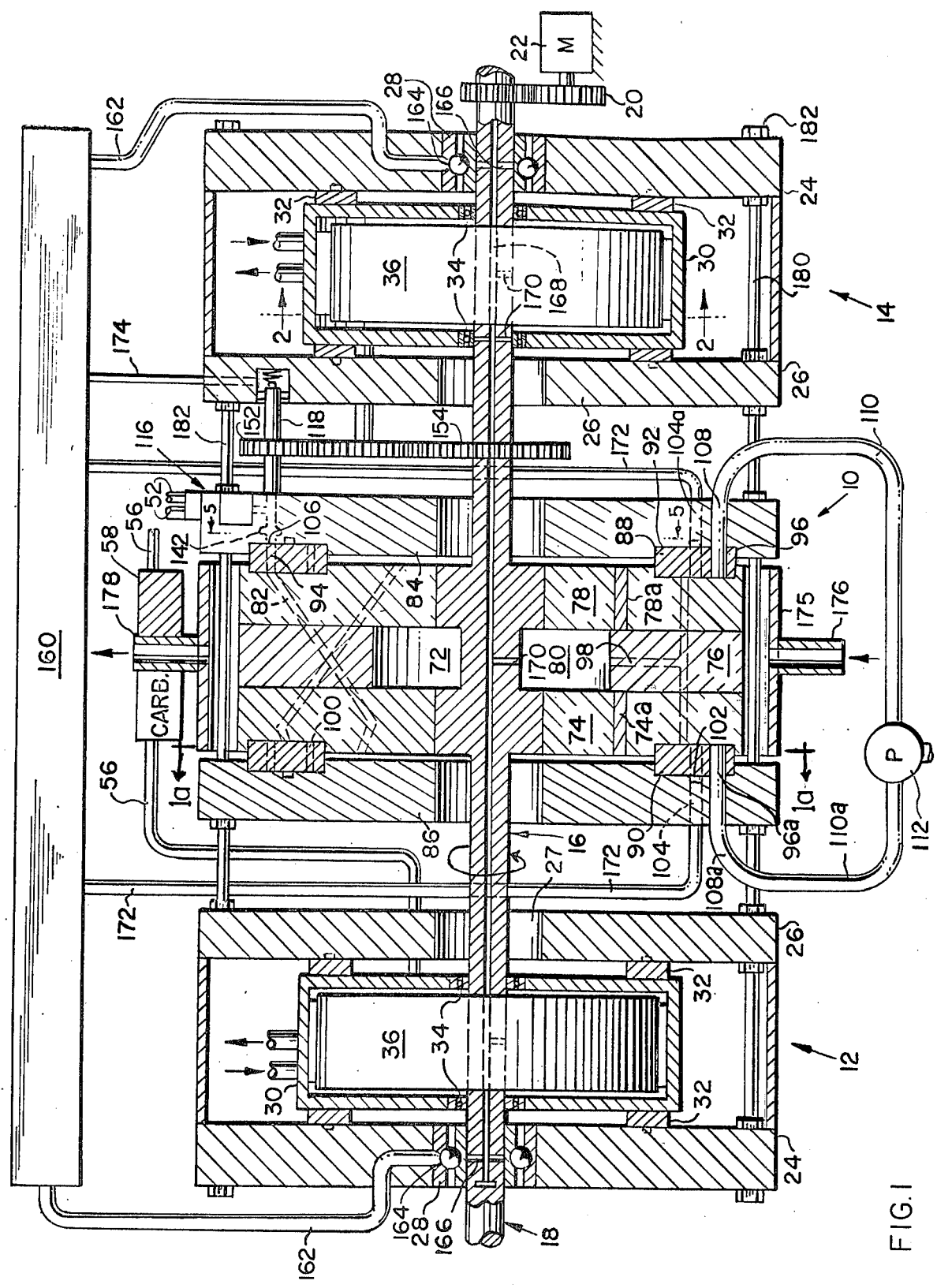

Each compressor unit 12 and 14 consists of a pair of fixed spaced parallel square plates 24 and 26. The plates 24 are located at the extreme ends of the assembly and include main bearings 28 rotatably journalling the drive shaft 16. The bearings 28 are heavy duty high ball or roller bearings or other antifriction bearings conventional in the engine art. Each inner retaining plate 26, on the other hand, is provided with an enlarged central diameter so that a considerable annular gap 27 is provided about the shaft 16.

Concentrically mounted about the shaft 16 and between the plates 24 and 26 of each compressor unit 12 and 14 is a sealed cylindrical compressor housing 30 which is fixedly secured to the plates 24 and 26 by a plurality of bolts or other fastening means 32. Each compressor housing 30 is sealed with respect to the shaft 16 by a pair of sealed bearings 34 which permit rotation of the shaft while maintaining the housing air tight. Located within the housing 30 is an eccentric barrel rotor generally defined by the number 36. As seen in detail in FIGS. 2 and 3, each rotor 36 is formed of three discs 38, 40 and 42 of equal outer diameter.

Figure 3:
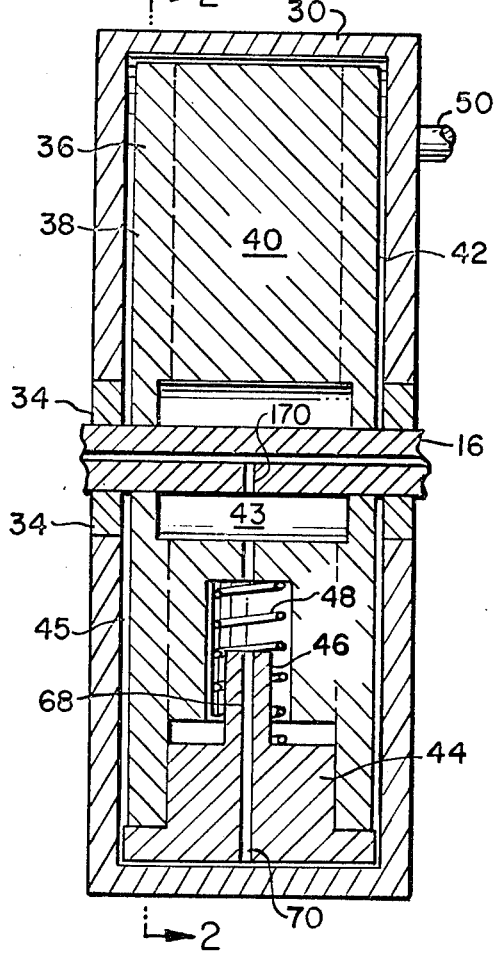
FIG. 3 is a cross-sectional view of one of the compressor units shown in FIG. 1 partially broken away.

The discs are welded or otherwise secured together to form a unitary body. The exterior discs 38 and 42 are preferably secured to the shaft 16 by providing the shaft with a key or spline and the discs 38 and 42 with a mating key way or internal spline surface so that the rotor may be axially slid in place over the shaft but besssecured for conjoint rotation with it. The inner diameter of the center disc 40 is spaced from shaft 16 and thus defines therebetween an annular chamber or oil storage reservoir 43. As seen in FIG. 2, the barrel rotor 36 mounts three wipers 44 equiangularly spaced about the rotor in radial slots 45. The wipes 44 are provided with a post 46 about which a compression spring 48 is located, urging the wiper radially outward into sliding engagement with the inner circumferential wall of the housing 30. The wipers 44 extend transversely from front to rear of the vertical walls of the housing 30, as seen in FIG. 3.

Located at the upper end of the compressor housing 30 and slightly askew from the vertical axis (i.e.: slightly counter-clockwise) is a discharge opening 50 communicating with a conduit 52. Slightly higher than the transverse or horizontal axis is a second opening or intake port 54 to which a conduit 56 is connected. The conduit 56 leads from a conventional carburator 58 or fuel injection system from which a fuel mixture of desired concentration is received.

As seen in FIG. 2 the compressor rotor rotates clockwise in the direction of arrow A and is offset or eccentric from the center, denoted by shaft 16 so that on rotation, a large intake chamber 60 is provided following the intake port 54 while a narrowing pressure chamber 62 is created in proximity to the discharge port 50. Thus, on rotation of the compressor rotor, the fuel fed into chamber 60 is compressed and is expelled through the discharge opening 50. The provision of wipers 44 insures positive flow in the direction of rotation and insures entry of sufficient fuel at given intervals for successful compression ratios. Since no actual combustion of fuel occurs in the compressor, scavenging ports are not required. The gas may be supplied from a vapor carburator or fuel injection system as desired. Preferably, the discharge opening 50 is provided with a check valve 64 such as a butterfly flap. A ball check may also be used.

It has been found that a compressor having a housing approximately 9 inches wide, 13 inches in diameter, and a rotor of 12 inches in diameter, eccentric by about 1 inch provides a three stage, positive displacement of approximately 50 cubic inches. Compression ratios of up to 20:1 may be thus obtained. The plates 24 and 26 need be no larger than 14 × 14 × 1 inch.

To insure continued operation under low heat and friction, the rotor 36 and its wipers are provided with lubricant through a radial duct 68 extending from the reservoir 43 to the slot 45. The wipers themselves are provided with a small radial duct 68 extending through the post 46 to their slide face which is provided with a shallow transverse groove 70 through which the lubricant flows. If desired the wiper may also be provided with grooves on the edge surfaces (i.e.: where it engages the surfaces of the side walls of the housings 30) so that the lubricant will then pass from the chamber 43 to the functional engaging surfaces between the wiper and the compressor housing.

Turning back to FIG. 1, the drive unit 10 consists of a rotor generally depicted by numeral 72 which is actuated by the expansion of combusted gases fed to it. The rotor comprises three circular discs 74, 76 and 78, which, by use of welding keys 74a and 78a are secured together to form a unitary body similar to that of the compression rotor. The drive rotor 72 is secured to the drive shaft 16 also by providing the shaft exterior discs 74 and 78 with mating keys and keyways which cause conjoint movement of the rotor and shaft. The interior rotor disc 76 is provided with an enlarged inner diameter so that, here too, a lubricant storage chamber 80 is formed annularly about the shaft.

Figure 5:
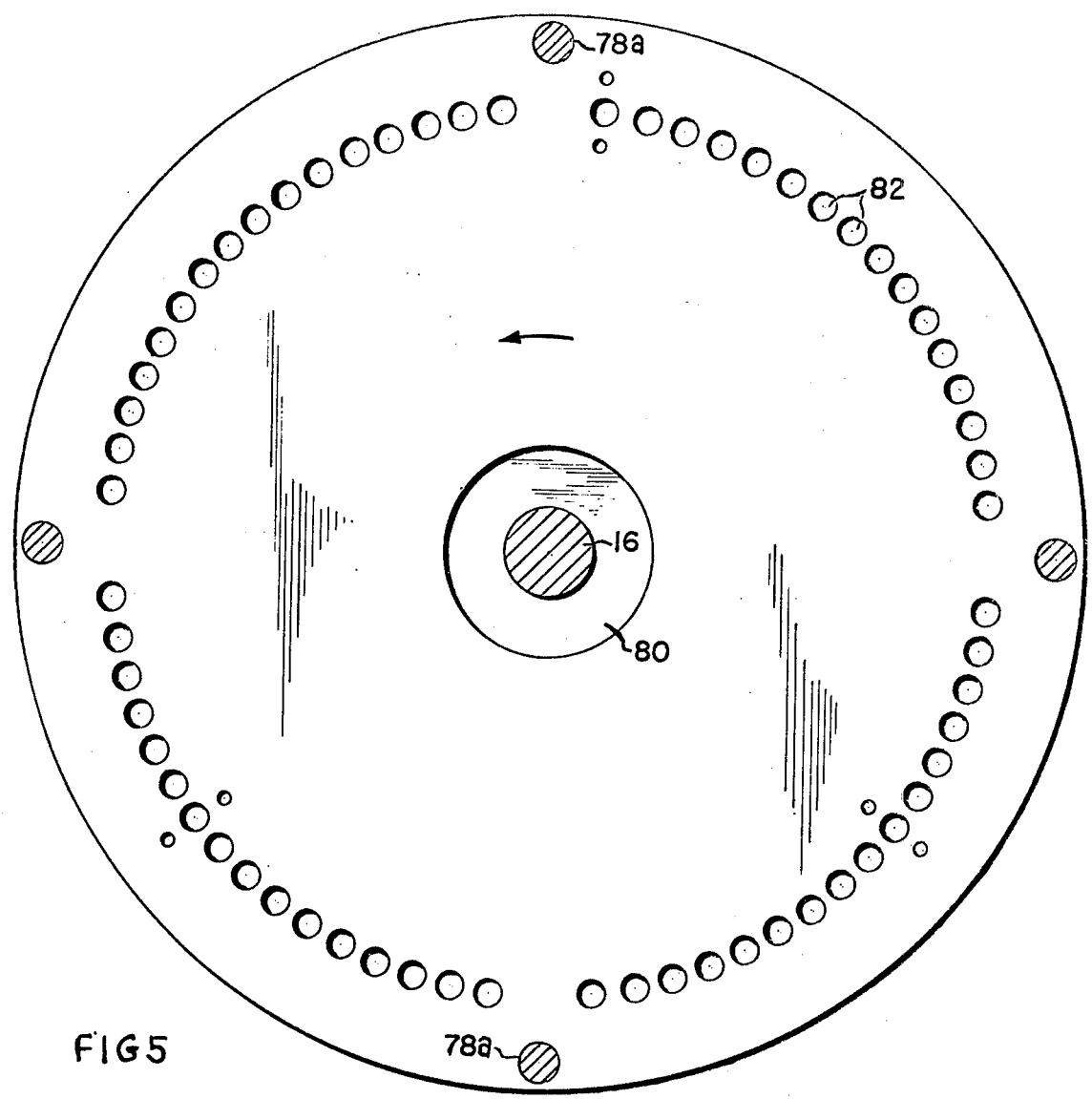
Figure 5A:
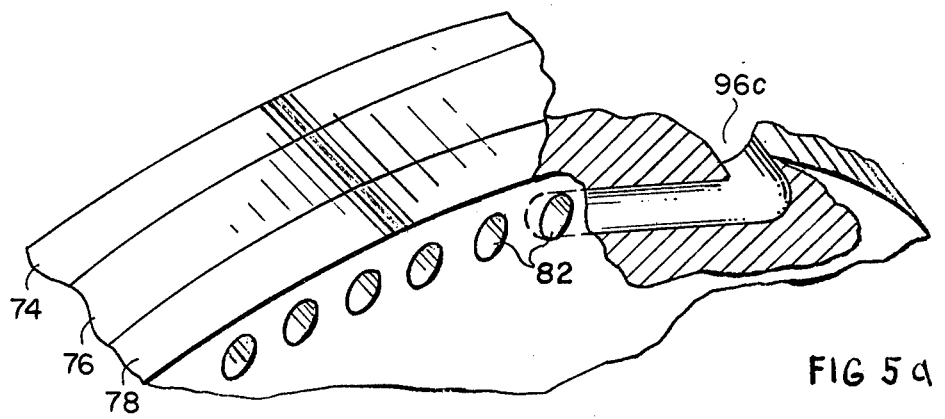
FIG. 5a is a detail thereof.

The fixed assembly of discs 74, 76 and 78 are drilled with a plurality of uniformly spaced parallel bores 82 of which only two are shown in dotted lines in FIG. 1, but all are depicted in FIG. 5. These bores 82 extend in a first portion from the outer face of disc 78 through disc 76 in the desired direction of rotation and approximately midway into the disc 74 at whic time they change direction angularly to form a dog leg angularly extending from the main bore portion in an opposite direction relative to the direction of rotation. Thus the front portion provides a gas bore directed toward the direction of rotation and outwardly toward the periphery of the disc 78 so that the rotor may be driven upon the entry of gas into same, as indicated by the arrow B, while the dog leg being in the opposite direction provides an exhaust duct against which the gas impinges to develope rotational thrust by both impulse on the elbow formed by the dog leg and by reaction against the oppositely directed dog leg itself. The dog leg further opens outwardly for the final dispersal of the gas from the rotor.

The rotor discs 74, 76 and 78 are flanked on each side by spaces square retaining plates 84 and 86 provided with annular sealing rings 88 and 90 set in mating grooves 92 formed in both the retaining plates 84, 86 and the faces of discs 78, 74 respectively. Each of the sealing rings 88, 90 which may preferably be stainless steel, bronze or even synthetic elastomeric material, resistant to lubricating oil and heat are secured by adhesion, welding, braising or by provision of mating keys and keyways, to the retaining plates so that they are not rotatable. The sealing rings 88 and 90 not only provide the bearing means on which the rotor 72 rotates but also the means by which it is stabilized and spaced during high speed operation. It also provides the means for sealing the expanding gases and the means for braking the rotor as will be described hereafter.

The front sealing ring 88 is provided with a gas inlet hole 94 in a position conforming to the inlets of the bores 82 formed in the rotor discs 74. The hole 94 is located at the upper end of the ring 88. A second hole 96 for exhaust of gas is located in the ring 88 90° in the direction of rotation from the hole 94. The exhaust hole 96 is larger than the gas bores 82. The opposite sealing ring 90 is also provided with an exhaust port 96a axially aligned with port 96, to provide exhaust means for the dog leg portion of bore 82.

Each of the retaining plates 84 and 86 are provided with an enlarged inner diameter spaced from the shaft 16 to permit free flow of air about the rotor. The drive rotor 72, however, is provided with one or more ducts 98 extending from the lubricant storage chamber 80 to the annular sealing rings 88 and 90 for flow of lubricant. The front and back sealing ring 88 and 90 are also provided with a plurality of small openings 100 through which the lubricant is expelled into an annular groove 102 formed in the back retaining plates 86 and 84 from which it leads into a conduit 104, and 104a respectively.

The front rotor retaining plate 84 is provided with a gas inlet port 106 which is aligned with the inlet hole 94 of the sealing ring 88. At a position 90° in the direction of rotation from the inlet port 106 is an outlet port 108 aligned with the exhaust hole 96 in the sealing ring 88 and in which is located an outlet pipe 110 connected to a source of vacuum 112 such as a suction pump of known design. The back plate 86 is provided with a similar exhaust port 108a and pipe 110a, aligned with the exhaust port 96a for the dog leg of the bores 82. This pipe 110a is also connected to the source of vacuum 112 although it may be left free to the atmosphere so that the gas bores 82 may be thoroughly scavenged. The outlet suction ports 96 and 96a and their conduits 110 and 110a are of larger size than the inlet port 94 and covers a plurality of gas bores 82 for quick exhaust scavenging of the bore 82 removes any gas residue which might be carried from the combustion chamber by the expanding gases.

As seen in FIG. 1a exhaust port 96a in the sealing ring 90 is enlarged to provide an arcuate groove 96b on its face engaging the disc 74. The groove 96b extends from approximately the position, indicated in FIG. 1a by (94), axially opposed to and corresponding along the circumference at which the inlet port 94 is located, in the oposite sealing ring 88, to the point at which the exhaust ports 96a is located. Thus the dog leg orifices communicate with the exhaust port 96 almost immediately after the compressed air is charged into each of one of the rotor bores 82. Consequently the air is free to expand immediately upon the passage of bore 82 past the inlet port 96a, thereby providing a free moving turbine effect propelling the rotor and then turning the shaft 16, in the direction of the arrow. Alternatively, the arcuate groove need not extend completely to the point corresponding to the inlet position, since the rotor 72 being moved initially counter-clockwise by the starting motor and later by its own momentum will be carried to the arcuate groove during the period of time required for injected air flow from the inlet through the dog-leg porton. The seal ring 88 on the inlet side of the rotor is provided with a substantially smaller enlarged exhaust port or groove than sealing ring 90 since it is necessary to insure directional flow of air through the bore 82. The groove in seal ring 88 is provided to insure only that the bores 82 are scavenged by the vacuum pump P after dissipation of the energy of the injected air.

Further, the exterior end of the dog-leg portion of bore 82 can be funnelled or flared outwardly, as at 82b to insure communication of the bore 82 with the exhaust groove 96b, and the exhaust port 96a.

Figure 4:
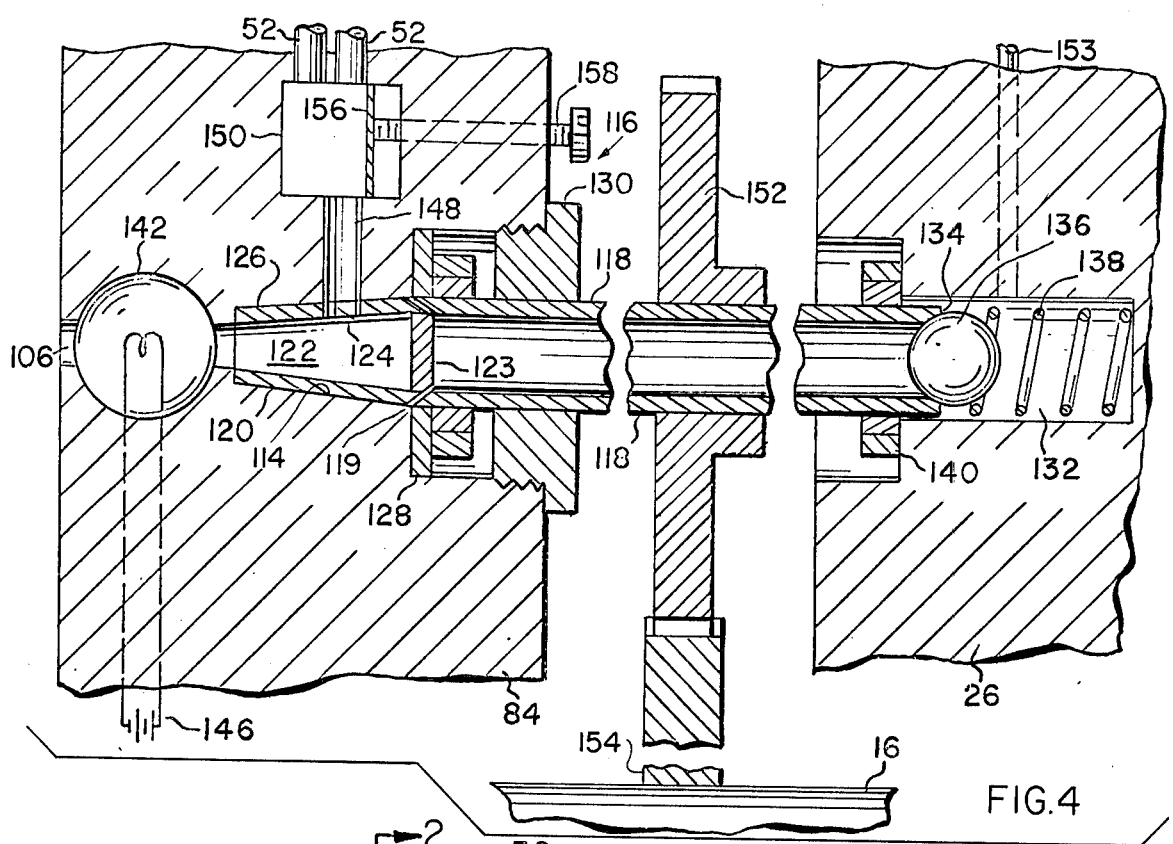
FIG. 4 is an exploded cross-sectional view of the gas feed mechanism.

Mounted within a bore 114 in the front retaining rotor plate 84, in line with the inlet port 106 is gas feed mechanism 116 shown in detail in FIG. 4. The gas feed mechanism 116 comprises an elongated rotatable shaft 118 having a conically tapered front end 120 in which is provided a hollow central bore 122 pointed at the inlet port. The bore 122 is sealed internally by a wall 123 to form a defined volume chamber at one end and the front end of the shaft 118 is set within a conforming opening 126 in the retaining plate and is provided with a disc bearing 128 limiting its entrance therein and a bushing 130 threaded to the retaining plate 84. The rear end of the shaft 118 extends within bore 132 formed in retaining plate 26 for the front compression unit 14 where its end 134 is seated against a ball 136 and spring 138 which normally urges the front end toward the inlet port. A second bearing disc 140 stabilizes the rear end of the hollow shaft in plate 26. Interposed between the inlet port 106 and the mouth of front end 120 of the gas feed is a bulbous cavity 142 formed in the retaining plate 84 into which an ignition wire 144 is inserted. The ignition wire 144 is connected to the engine battery 146 so that on initiation of operation the wire is caused to glow, remaining heated during continued operation.

The transverse bore 124 communicates with a duct 148 which is connected to a gas collector or pressure vessel 150 into which gas, under pressure, is fed from each of the compressor lines 52. Secured concentrically about the shaft 118 is a gear 152 which meshes through one or more gears with a gear 154 concentrically secured on the central shaft 16. The gear ratios are such that for each rotation of the central drive shaft 16, the shaft 118 of the gas feed is caused to rotate once at a 1:1 ratio. During each rotation a quantity of gas under pressure from the collector 150 is caused to flow into the feed opening through the bulbous space or combustion chamber 142 where it is heated and expelled into the gas bores through the inlet port 106. The amount of gas is determined by the volume of the bore 122 as well as the pressure determined within the collector 150. An oil inlet conduit 153 extends vertically through retaining plate 26 to communicate with the bore 132. Extending at an angle from the interior of the shaft 118 to the exterior face of the conical portion 120 are a plurality of pin holes 119.

The collector 150 comprises a variable storage container in which variable volumes of gas under variable pressures can be retained. Preferably, the collector 150 comprises a rectangular box in which one wall 156 is movable with respect to its opposed wall. A screw plug 158 threaded into the wall of the collector is manipulated to vary the position of the wall 156 thus varying the volume of the rectangular box. The smaller the box the greater the pressure created on the collected gas flowing into the collector. Connected to the collector are conduits 52 leading respectively from each of the compressor units 12 and 14.

Lubrication for the compressors 12 and 14 and for rotor 10 is provided through a closed system comprising a heat exchanger or oil radiator 160 for cooling and storing a quantity of oil. The radiator 160 is mounted on retaining plates 24 and is connected by conduits 162 to annular ducts 164 leading into both the front and rear main bearings 28 which support shaft 16. The main bearings are provided with annular openings in its inner race which are aligned with a radial duct 166 leading to the central bore 168 of the hollow shaft 16 which, of course, otherwise plugged at each end. The shaft 16 is provided with a series of radial ducts 170 extending from front to rear and aligned with each of bearings 34, reservois 43 and 80 and the second bearing 28 at the rear end of the assembly by which lubricant is thus distributed to each of the rotary and frictional parts. Lubricant which is not consumed, particularly the lubricant in the rotor reservoir 80, is returned to the radiator 160 for cooling via conduits 172 connecting the ducts 104a leading from the rotor sealing rings 84 and 86. The speed of the engine, i.e.: the rotation of shaft 16, drive rotor 10 and compressor rotors 36 is sufficient to cause flow of the lubricant without the necessity of providing any auxiliary pumps. Lubrication for the feed mechanism 116 is provided via a conduit 174 leading from the radiator 160 to the duct 153 in frame plate 26. The oil is pressure fed via the interior of the shaft 118 to the rubbing faces of the conical section 120 and stop member 128 via the pin holes 119. Since only a small amount of lubricant is required return flow to the radiator is not necessary.

Except for the noted lubrication, the engine, as a whole, is cooled only by flow of air about and between the respective parts. The compressors 36 and rotor 72 are surrounded by a body of air entering through the spaces between the shaft 16 and retaining plates 26, 84, and 86 which flows outwardly from the perimeter of the retaining plates. To promote cooling the main rotor 72 is provided with a jacket 175 which has an inlet line 176 at its lower end and an outlet line 178 at its upper end. A fan or air pump (not shown) is connected to lines 176 and 178 to force air about the rotor 72 if desired.

The fact that only two bearings support the drive shaft 16 (one at each end) considerably reduces wear and tear on the shaft and minimizes the generation of heat. A drive or main shaft of 1¼ inch with a ¼ hollow core is sufficient. The overall length of the assembly is approximately 29 inches; each of the rotor and compressor units being approximately 3 inches with 2 to 3 inch spaces between them.

The rotors are approximately 12 inches in diameter. The compressor housing is 13 inches. The retaining plates are approximately 1 by 14 inches square.

The six retaining plates 24, 26, 84 and 86 referred to above are connected by four unit tie rods 180 threaded end to end. On each rod there are 12 nuts 182. Half of the nuts are pressure nuts and the remainder are lock nuts. The pressure nuts are capable of being tightened or slackened as required to slide the plates along the shaft 16, and adjust the spacing between them. By adjusting the spacing between the rotor retaining plates 84 and 86 the pressure on the sealing rings 88 and 90 can be varied. The sealing rings exert a braking force on the rotor which can thus be predetermined.

A fuel injection system may be preferred since the rotation of the compressor and drive units provides a steady flow of air. By shrouding the units with a spaced cover, the air flow may be channelled at a high velocity to an injection chamber where it is mixed with fuel vapor such as that of gasoline for feeding to the compressor. A throttle valve or pedal is provided to control the flow of fuel. The richness of the ratio of gas to air (i.e.: combuston rate) will determine the speed of the engine.

As seen in FIG. 5 the bores 82 of the main rotor 72 are arranged symetrically circumferentially about the shaft 16 extending in a direction toward the direction of rotation in four groups of 13 each. The actual number of bores 82 is not critical although it is preferred that a relatively large number of small diameter bores be used. During operation the speed of the rotor past the inlet port or hole 106 is so great that more than one bore 82 will pass before all the combusted gas from feed means 116 is delivered to it. The bores are divided into four groups, conforming to the quadrants of the rotor even though as will be obvious gas is fed to the rotor 72 from feed 116 only once during every revolution of shaft 16. Only one group of bores is actually used to propel the rotor, during any one sequence of operation. The four groups are not only provided to insure balanced rotation and symetrical weight distribution but also to insure simplicity in assembly, since a critical arrangement between rotor 72 and feed 116 is consequently, not necessary. The force of the expanding gases into one or more of the bores 82 is sufficient to rotate the rotor 72 and accelerate the rotation of shaft 16. As the bores 82 filled with gas move past the the exhaust ports 96 they are scavenged of air so that they may again be prepared to accept a new burst of expanding gas from feed 116.

In operation motor M is energized thereby causing the starting gear 20 to rotate and rotate shaft 16. As shaft 16 turns the rotors of the compressor units 12, 14 are rotated since they are keyed or otherwise operatively connected to the shaft. A supply of combustible fluid is provided by carburetor 58 through intake port 54 into chamber 60. As the rotor rotates in counterclockwise direction the fluid is compressed and forced out of conduit 52. This conduit is connected to the gas collector 150 of the feed mechanism 116 which runs off the shaft 16 in timed sequence. The compressed fluid is forced by the feed mechanism into a combustion chamber where it is combusted and directed through conduit means 94 and rotor holes 82 so as to develop rotational thrust within rotor 10. As rotor 10 is caused to rotate it drives shaft 16 and the load which may be suitably connected to the shaft as by gearing train 18.

Although the invention has been described with a certain degree of particularity, it will be understood that the engine disclosed is merely a preferred embodiment of the invention, that persons skilled in the art will recognize that numerous changes in the details of construction and in the arrangement of parts may be resorted to without departing from the spirit and scope of the invention as hereinafter claimed.

What is claimed is:

1. A rotary engine comprising a stationary housing for having a drive rotor and a compressor, a drive shaft journalled in said housing concentrically mounting said drive motor for rotation therewith, said drive rotor comprising at least one rotating plate having a plurality of separate transverse holes extending the entire width of said drive rotor, a rotary compressor mounted on said drive shaft for rotation therewith near said drive rotor, a source of combustible fluid, means connecting said source of combustible fluid with said rotary compressor for directing said combustible fluid to said one rotary compressor, feed means mounted between said rotary compressor and said drive rotor for sequentially feeding discrete portions of said combustible fluid from said one rotary compressor to said drive rotor in timed relationship with the passage of predetermined ones of said holes of said drive rotor, means for igniting the discrete portions of said combustible fluid prior to reaching the associated one of said holes of said drive rotor, said feed means comprising a collector chamber having one movable wall for varying the volume of said collector chamber, a rotatable hollow control shaft having at least one opening formed on the circumference thereof for allowing compressed combustible fluid stored in said collector chamber to enter into the interior of said hollow control shaft upon the alignment of said at least one opening with said collector chamber, first gear means mounted about said hollow control shaft and second gear means mounted about said drive shaft near said first gear means and meshing therewith, whereby the rotation of said hollow control shaft is controlled in timed relation with said drive shaft so that compressed combustible fluid is supplied to said means for igniting in timed sequence, conduit means connecting said means for igniting said combustible fluid with said drive rotor for delivering the ignited fuel to said predetermined ones of said holes rotatably driving said drive rotor, means for lubricating said drive rotor, said drive shaft, and said at least one rotary compressor, and housing means housing said drive rotor and said rotary compressor.

2. The rotary engine according to claim 1 wherein said compressor comprises at least one rotating plate mounted to said drive shaft for rotation therewith, and at least one movable arm extending from said at least one plate for rotation therewith for compressing the combustible fluid supplied to said rotary compressor by said means connecting said source of combustible fluid with said rotary compressor, said at least one movable arm contacting said housing means so as to compress the combustible fluid during the rotation thereof.

3. The rotary engine according to claim 1, wherein said transverse holes are spaced angularly about said at least one rotating plate, each of said holes having a first opening portion for the reception of compressed combustible fluid therein from said feeding means, a second elongated portion extending at an angle from said first portion in the direction of rotation and forming an angle with a transverse plane of the drive rotor, and a third exhaust portion extending at an angle relative to said second portion in the direction opposite to the direction of rotation.

4. The rotary engine according to claim 1, wherein said housing means comprises a compressor housing encasing said at least one rotary compressor, said compressor housing having an inlet opening for receiving the combustible fluid supplied thereto by said means connecting said course of combustible fluid with said at least one rotary compressor, and an outlet opening spaced angularly about said compressor housing from said inlet opening for allowing the combustible fluid compressed by said at least one rotary compressor to be fed to said drive rotor by said feeding means.

5. The rotary engine according to claim 2, wherein said at least one rotary compressor comprises three movable arms, three slots spaced angularly about said at least one rotating plate mounting said three movable arms therein for slidable movement and resilient means mounted in said three slots for urging said three movable arms toward said housing means housing said rotary compressor, said housing means being mounted eccentrically about said at least one rotary compressor so that when said at least one rotating plate with said three movable arms rotates the volume defined between said rotating plate and said housing means varies in the direction of rotation of said rotating plate.

6. The rotary engine according to claim 1, wherein said housing means comprises a drive rotor housing and a compressor housing, said collector chamber and control shaft being mounted in said drive rotor housing, and said first and second gear means being mounted between said drive rotor housing and said compressor housing.

7. The rotary housing according to claim 6, wherein said means for igniting comprises a bulbous cavity in said drive rotor housing positioned near the end of said hollow control shaft and heating means mounted in said drive rotor housing for heating and igniting the compressed combustible fluid supplied to said bulbous cavity from said hollow control shaft.

8. The rotary engine according to claim 1 wherein said source of combustible fluid comprises a carburetor, and said at least one rotary compressor three rotating plates welded together.

9. The rotary engine according to claim 1, wherein said means for lubricating comprises a storage chamber for a lubricant, a longitudinal passage in said drive shaft extending along a portion of the length thereof and at least one passage connecting said longitudinal passage in said drive shaft with said at least one movable arm of said at least one rotary compressor.

10. The rotary engine according to claim 9, wherein said drive rotor comprises three rotating plates welded together, and said at least one compressor comprises three rotating plate welded together, the middle one of each of said three plates having a larger central opening to define a storage chamber therein for lubricant, said means for lubricating further comprising at least one passage connecting said longitudinal passage in said drive shaft with the storage chambers in each of said drive rotor and at least one rotary compressor.

11. The rotary engine according to claim 1, wherein said rotary engine comprises two rotary compressors mounted about said drive shaft and rotatable therewith, said drive rotor being mounted between said two rotary compressors.

12. The rotary engine according to claim 1, wherein said housing means comprises a drive rotor housing and a rotary compressor housing, said drive rotor housing comprising a first and a second plate sandwiching said drive rotor therebetween, and first and second seals mounted between said first plate and one end of said drive rotor and said second plate and the other end of said drive rotor, respectively, and means for adjusting the distance between said first and second plates for adjusting the pressure seals exert on said drive rotor to thereby vary the torque output of said drive rotor.

13. The rotary engine according to claim 12, wherein said drive rotor housing comprises exhaust means for scavenging the gases in said drive rotor, and an exhaust pump for insuring the exhaust pump for insuring the exhaust of said gases.

* * * * *